(12) United States Patent
Wei et al.

(10) Patent No.: US 11,309,789 B2
(45) Date of Patent: Apr. 19, 2022

(54) INVERTER AND SOFT-START METHOD FOR THE SAME

(71) Applicant: Delta Electronics (Shanghai) Co., Ltd., Shanghai (CN)

(72) Inventors: Qikang Wei, Shanghai (CN); Feidong Xu, Shanghai (CN); Xuancai Zhu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 28 days.

(21) Appl. No.: 17/024,715

(22) Filed: Sep. 18, 2020

(65) Prior Publication Data

US 2021/0135563 A1 May 6, 2021

(30) Foreign Application Priority Data

Nov. 5, 2019 (CN) .......................... 201911072847.X

(51) Int. Cl.
*H02M 1/36* (2007.01)
*H02M 1/08* (2006.01)
(Continued)

(52) U.S. Cl.
CPC ............... *H02M 1/36* (2013.01); *H02M 1/08* (2013.01); *H02M 7/53871* (2013.01); *H02M 1/0009* (2021.05)

(58) Field of Classification Search
CPC ........ H02M 1/36; H02M 1/08; H02M 1/0009; H02M 7/53871; H02M 7/53876; H02J 3/38
See application file for complete search history.

(56) References Cited

U.S. PATENT DOCUMENTS

2017/0346389 A1* 11/2017 Lung ..................... H02M 1/32
2018/0145582 A1 5/2018 Shuai et al.

FOREIGN PATENT DOCUMENTS

CN 103795080 A 5/2014
CN 102545678 B * 7/2014
(Continued)

OTHER PUBLICATIONS

Qing-Chang Zhong et al., "Self-synchronised Synchronverters: Inverters without a Dedicated Synchronisation Unit", IEEE, 2013.
(Continued)

*Primary Examiner* — Kyle J Moody
*Assistant Examiner* — Jye-June Lee
(74) *Attorney, Agent, or Firm* — CKC & Partners Co., LLC

(57) ABSTRACT

The invention discloses an inverter and a soft-start method for the same. The inverter is electrically connected between a DC power supply and a grid and includes a main power circuit electrically coupled to the grid through a relay, a filter, the relay, and a controller electrically connected with the main power circuit and the relay, respectively. The soft-start method includes: sampling a grid voltage of the grid; calculating an output voltage of the controller, and calculating a virtual current based on the output voltage of the controller, the grid voltage and a virtual impedance; and performing current closed-loop control by taking the virtual current as a feedback signal and sending a relay control signal to turn on the relay when a steady state is reached. The invention enables the soft start of the inverter without increasing any hardware circuit, such as a starting resistor, or the like.

24 Claims, 5 Drawing Sheets

(51) Int. Cl.
*H02M 7/5387* (2007.01)
*H02M 1/00* (2006.01)

(56) References Cited

FOREIGN PATENT DOCUMENTS

| | | | |
|---|---|---|---|
| CN | 103928946 A | | 7/2014 |
| CN | 104600753 A | | 5/2015 |
| CN | 103795080 B | | 10/2015 |
| CN | 106655275 A | | 5/2017 |
| CN | 104953617 B | | 8/2017 |
| CN | 108574302 A | | 9/2018 |
| CN | 107241028 B | | 4/2019 |
| CN | 109698517 A | | 4/2019 |
| EP | 0492396 A1 | | 7/1992 |
| JP | H0928040 A | * | 1/1997 |

OTHER PUBLICATIONS

ZHOU Xiao-jie, Vector Control for Single-phase Grid-connected Inverter Based on Virtual-phase Circuit, Power Electronics, vol. 49, No. 2, Feb. 2015.

\* cited by examiner

INVERTER AND SOFT-START METHOD FOR THE SAME

CROSS-REFERENCE TO RELATED APPLICATIONS

This non-provisional application claims priority under 35 U.S.C. § 119(a) on Patent Application No. 201911072847.X filed in P.R. China on Nov. 5, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "Prior Art" to the present invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to an inverter and a soft-start method for the same.

2. Related Art

When a relay of a grid-connected inverter is turning on, due to a difference between a capacitor voltage and a grid voltage, a large inrush current will be generated, which may disturb the control system and damage devices of the inverter. In order to ensure the safe starting of the inverter, it requires that the difference of voltages between the contactors of relay to be maintained to be a small value, i.e., synchronization between the voltage on the capacitor and the grid voltage.

To solve the problem, some methods are proposed. For example, the inrush current is reduced by the method of connecting resistors in series in the circuit, but such method increases hardware cost and loss and also does not conform to the safety requirement of the inverter. Another method is to generate a voltage approximately to the grid voltage on the capacitor through feed-forward control of the grid voltage, but this is a method of open-loop control, which is difficult to ensure the voltage difference to be constantly zero. And when the relay is turning on, the current rapidly increases within a short time, and the driving signal shall be timely blocked. However, the actual action time of the three relays of the three-phase inverter is different, and it takes a relatively long time to ensure the switching actions of the inverters. Further, there are other methods for closed-loop control, but these methods need to monitor a voltage before the relay, which increases hardware cost.

In addition, the conventional soft-start method seldom controls energy, and the fluctuation of a bulk voltage is uncontrollable. For example, as for a photovoltaic inverter, the panel voltage is high under strong light so that overvoltage protection is prone to be triggered in the case that the bulk voltage fluctuates upwardly; while the panel voltage is low under weak light so that it is difficult to start in the case that the bulk voltage falls suddenly.

Therefore, it is necessary to find a soft-start method for an inverter, which solves the issue of synchronizing voltages before and after the relay in a simple and effective manner and can control energy flow.

SUMMARY OF THE INVENTION

In view of this, one object of the invention is to provide an inverter and a soft-start method for the same, which can softly start the inverter without increasing hardware circuit, such as, a starting resistor, a voltage sampling circuit, or the like.

Another object of the invention is to provide an inverter and a soft-start method for the same, which may be suitable for the circumstance of inconsistent of actual action time of the three relays. Meanwhile, the method also may control energy to prevent failure of startup caused by fluctuation of the bulk voltage.

In a first aspect, an embodiment of the invention provides a soft-start method for an inverter electrically connected between a DC power supply and a grid, and the inverter comprising a main power circuit, a filter, a relay, and a controller, and the main power circuit electrically coupled to the grid through the relay, and the controller electrically connected with the main power circuit and the relay, respectively, the soft-start method comprising:

sampling a grid voltage of the grid;

calculating an output voltage of the controller, and calculating a virtual current based on the output voltage of the controller, the grid voltage and a virtual impedance; and performing current closed-loop control by taking the virtual current as a feedback signal, and sending a relay control signal to turn on the relay when a steady state is reached.

In a second aspect, an embodiment of the invention provides an inverter electrically connected between a DC power supply and a grid and comprising a main power circuit, a filter, a relay, and a controller, and the main power circuit electrically coupled to the grid through a relay, and the controller electrically connected to the main power circuit and the relay, respectively, the controller comprising:

a sampling unit for sampling a grid voltage of the grid;

a virtual current calculating unit for calculating an output voltage of the controller, and calculating a virtual current based on the output voltage of the controller, the grid voltage and a virtual impedance; and a current control unit for performing current closed-loop control by taking the virtual current as a feedback signal, and sending a relay control signal to turn on the relay when a steady state is reached.

Hereinafter the above contents are explicitly described with the embodiments, and further explanations to the technical solution of the invention are provided.

BRIEF DESCRIPTION OF THE DRAWINGS

To make other objects, features, advantages, and embodiments of the invention clearer and understandable, the appended drawings are illustrated as follows.

DETAILED EMBODIMENTS OF THE INVENTION

Figure 1:
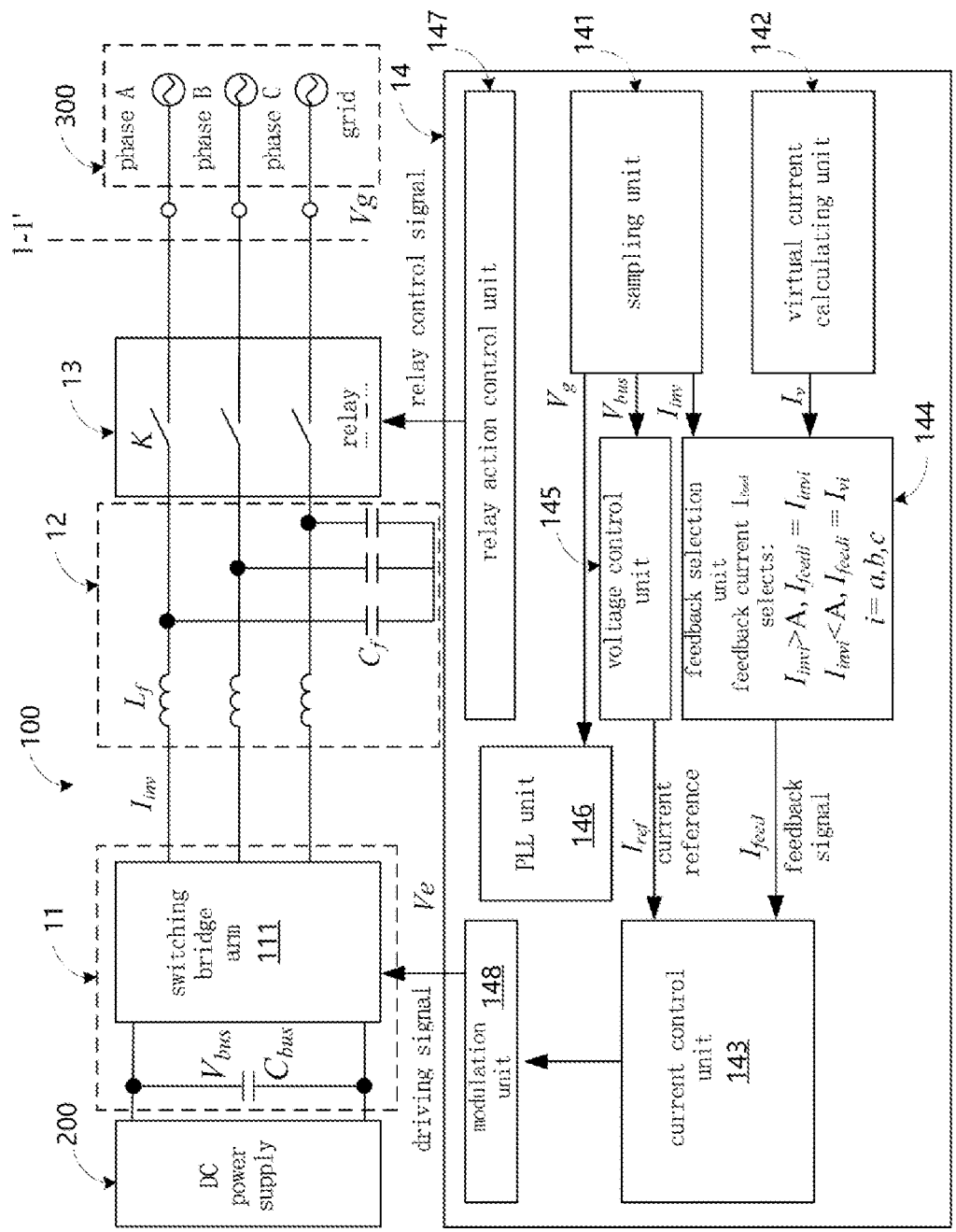
FIG. 1 is a structural diagram of an inverter according to an embodiment of the invention.

To make a description of the invention more elaborate and complete, the appended drawings and the various embodiments can be referred, and the same numbers in the drawings represent the same or similar components. On the other hand, the commonly known components and steps are not described in the embodiments to avoid unnecessary limits to the invention. In addition, in order to simplify the drawings, some known common structures and elements are illustrated in a simple way in the drawings.

As shown in FIG. 1, it illustrates the structure of an inverter 100 according to an embodiment of the invention. The inverter 100 is electrically connected between a DC power supply 200 and a grid 300. The DC power supply may be a voltage source, such as, an energy storage battery, a PV panel, and the like, and also may be a former circuit having a DC output. The inverter 100 mainly comprises a main power circuit 11, a filter 12, a relay 13 and a controller 14, wherein the main power circuit 11 is electrically coupled to the grid 300 through a relay 13; the filter 12 is electrically connected to the main power circuit 11 and the relay 13 for filtering a voltage and a current output from the main power circuit 11; the controller 14 is electrically connected with the main power circuit 11 and the relay 13, respectively, and configured to control the working state of the main power circuit 11 and turn on/off of the relay 13 according to actual requirements.

In this embodiment, the main power circuit 11 may comprise a DC bulk capacitor $C_{bus}$ and at least one switching bridge arm 111. The DC bulk capacitor $C_{bus}$ is electrically connected between the DC power supply 200 and the switching bridge arm 111. In a three-phase system, the switching bridge arm 111, for example, may be a three-phase full bridge topological structure, and in a single-phase system, the switching bridge arm 111, for example, may be a single-phase full bridge topological structure. However, it can be understood that the main power circuit is not limited to the topological structures discussed above, but can also be other topological structures, to which the invention is not limited.

Figure 4:
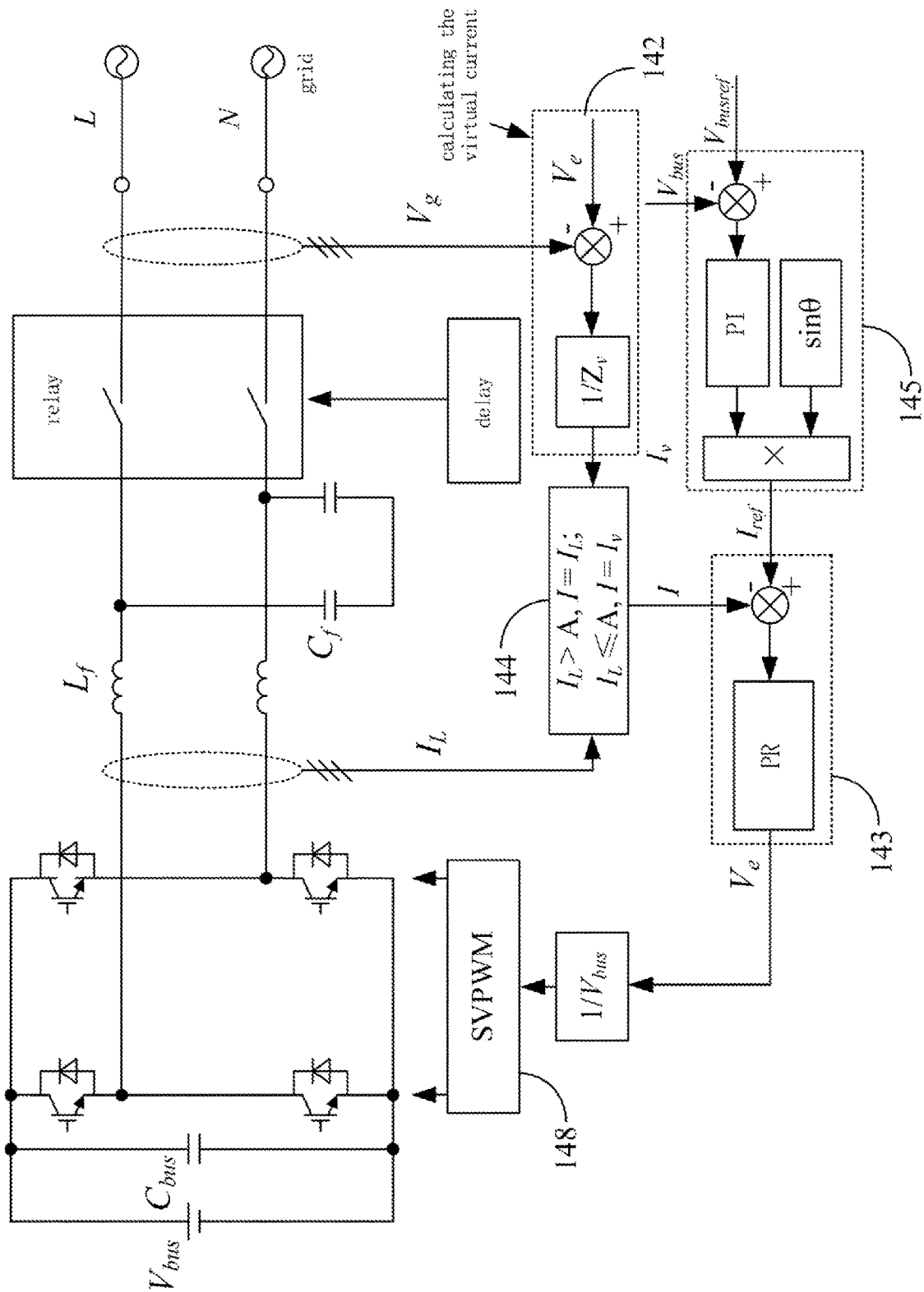
FIG. 4 is a control block diagram of a single-phase inverter controlling with the virtual current according to the invention.

In this embodiment, the inverter 100 is a three-phase inverter, and the grid 300 is a three-phase grid, i.e., comprising A phase, B phase, and C phase. Taking an LC filter for example, the filter 12 comprises a filter inductor $L_f$ and a filter capacitor $C_f$ of every phase. The relay 13 is a three-phase relay K. Three output ends of the main power circuit 11 are coupled to three-phase grid 300 through the LC filter and the three-phase relay K accordingly. However, it can be understood that the inverter 100 may also be a single-phase inverter, and correspondingly, the grid 300 may also be a single-phase grid (as shown in FIG. 4). Moreover, the filter 12 also can be other types of filter, such as an L filter, or an LCL filter, and the invention is also not limited thereto.

In the invention, the controller 14 at least comprises a sampling unit 141 for sampling a grid voltage $V_g$ of the grid 300, a virtual current calculating unit 142 for calculating an output voltage $V_e$ of the controller 14, and calculating a virtual current $I_v$ based on the output voltage $V_e$ of the controller, the grid voltage $V_g$ and a virtual impedance $Z_v$, and a current control unit 143 for current closed-loop control by taking the virtual current $I_v$ as a feedback signal and sending a relay control signal to turn on the relay 13 until a steady state is reached.

In the invention, the virtual current calculating unit 142 may calculate the virtual current $I_v$ based on the following formula 1:

$$I_v = \frac{(V_e - V_g)}{Z_v} \quad \text{(formula 1)}$$

wherein $I_v$ is the virtual current, $V_e$ is the output voltage of the controller, $V_g$ is the grid voltage, and $Z_v$ is the virtual impedance.

Further, in this embodiment, the current control unit 143 also may compare the virtual current $I_v$ with a current reference $I_{ref}$ to generate a current error, and determine an output voltage $V_e$ of the controller 14 corresponding to the current error through a current regulator.

In some embodiments, the judgment of the "steady state", for example, can be that the virtual current $I_v$ is approximately equal to the current reference $I_{ref}$, or can be viewed to reach a steady state after a delay time. In other embodiments, the output voltage $V_e$ of the controller 14, for example, may also comprise a modulated gain of Pulse-Width Modulation (PWM), of which an order of magnitude is equivalent to the grid voltage $V_g$.

Further, in this embodiment, the sampling unit 141 can sample an inverter current $I_{inv}$, wherein the inverter current $I_{inv}$ can, for example, be a current on an output end of the main power circuit 11, or an inductor current $I_L$ of the filter inductor $L_f$ of the filter 12. The controller 14 further comprises a feedback selection unit 144 configured to compare the inverter current $I_{inv}$ with a threshold value A, if the inverter current $I_{inv}$ is greater than or equal to the threshold value A, the feedback selection unit 144 selects the inverter current $I_{inv}$ as the feedback signal for current closed-loop control, and if the inverter current $I_{inv}$ is less than the threshold value A, the feedback selection unit 144 selects the virtual current $I_v$ as the feedback signal for current closed-loop control. The threshold value A is set to be greater than the maximum normal inverter current when the relay 13 is turned off. The selection of the threshold value A needs to ensure that the controller won't misjudge to result in the exit of the virtual current control in advance. Assuming that when the virtual current control reaches to a steady state, a peak value of the inverter current is $I_p$, and at this moment, the relay is turning on, due to difficulty of complete balance in control, current often increases (it also can actively generate an unbalanced state when the controller is designed). If the virtual current control is continued to be adopted, the inverter current will constantly increase and exceed $I_p$. Therefore, it should change to real inverter current control timely. And if the preset threshold value A is set to be less than the peak value of the inverter current $I_p$, then the controller will switch to control real the inverter current before the relay is turned on completely. Then, the phenomenon that current is controlled to a given value, and voltage is not synchronized with the grid occurs. In conclusion, whether the relay is turned on is determined based on the relation between the inverter current and the threshold value A, thereby determining whether to exit the virtual current control.

As for the three-phase inverter, the feedback selection unit 144 compares inverter current $I_{invi}$ (wherein i=a, b, c) of each phase to the threshold value A. If the inverter current $I_{invi}$ is greater than the threshold value A, the inverter current $I_{invi}$ (wherein i=a, b, c) is controlled as the feedback signal. Otherwise, the virtual current $I_v$ is controlled as the feedback signal.

Further, in the application of the photovoltaic inverter, when sunlight is strong, the output voltage of photovoltaic panels is high, causing that the DC bulk voltage fluctuates upwardly to easily trigger overvoltage protection, and when sunlight is weak, the energy of the photovoltaic panels is insufficient, and the DC bulk voltage may suddenly fall, which may cause the inverter starting difficultly. Therefore, in this embodiment, the sampling unit 141 also may sample the output voltage of the DC power supply 200, such as the DC bulk voltage $V_{bus}$ of the inverter 100. The controller 14 further comprises a voltage control unit 145, such as, a DC bulk voltage loop for voltage loop control based on the DC bulk voltage $V_{bus}$ and a DC bulk reference value $V_{busref}$, and taking an output of the voltage loop as the current reference instruction $I_{ref}$. In other embodiments, the voltage control unit 145 may further comprise an amplitude limit unit (not shown) for limiting the amplitude of the output of the voltage loop.

Figure 3:
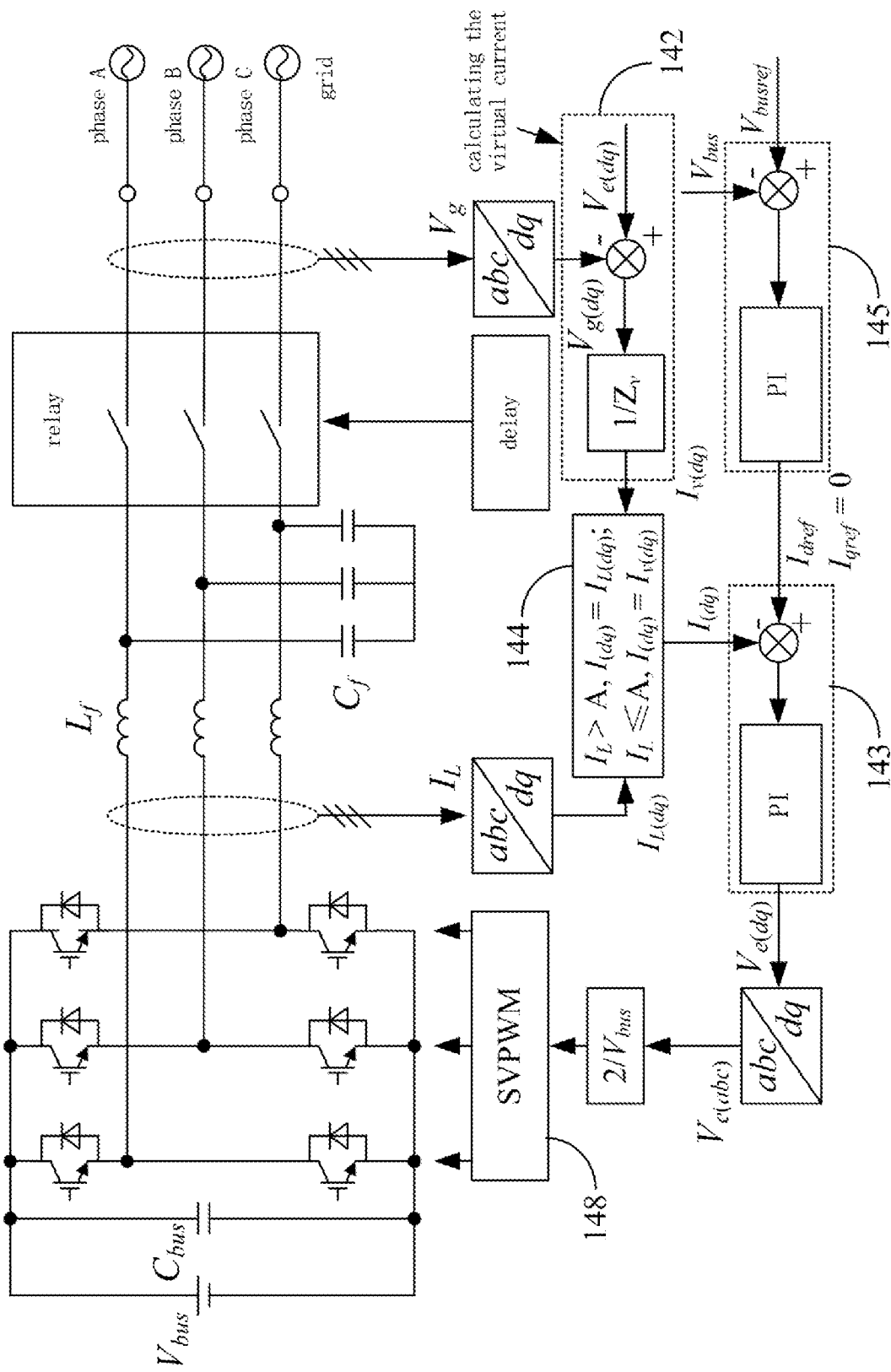
FIG. 3 is a control block diagram of a three-phase inverter controlling with a virtual current according to the invention.

In the three-phase inverter control system, referring to FIG. 3, the controller 14 further comprises a first coordinate conversion unit for converting the grid voltage $V_g$ and the inverter current $I_{inv}$ (inductor current $I_L$) from an abc three-phase coordinate system into a voltage and a current in a dq synchronous rotating coordinate system through abc-dq coordinate transformation. Further, the voltage control unit 145 may also take the output of the voltage loop as a current reference $I_{dref}$ of the d-axis, and set a current reference $I_{qref}$ of the q-axis to be a preset value, such as zero. Further, the controller 14 comprises a second coordinate conversion unit for converting control results in dq-axis into the abc three-phase coordinate system through dq-abc coordinate transformation for pulse width modulation.

Further, the controller 14 sends driving signals to corresponding switches of the switching bridge arm 111 of the main power circuit 11. As shown in FIG. 1, the controller 14, for example, may further comprise a modulation unit 148. The modulation unit 148, for example, may perform control of Space Vector Pulse Width Modulation (SVPWM), and generate a corresponding driving signal. Further, the controller 14, for example, may comprise a PLL (phase-locked loop) unit 146 for phase tracing according to the grid voltage.

Further, the controller 14 may send relay control signals (including a relay turn-on signal and a relay turn-off signal) to control the corresponding relay to execute corresponding actions through a relay action control unit 147. For example, the controller 14 sends the relay turn-on signal to turn on the relay 13 or sends the relay turn-off signal to turn off the relay 13. In some embodiments, when soft-start control is performed, the controller 14 sends the relay control signal to turn on the relay 13 after a delay time. In some other embodiments, the controller 14 sends the relay control signal to turn on the relay 13 after the current error is less than an error threshold value. That is, whether control reaches the steady state can be judged through the above method.

Correspondingly, referring to FIG. 1, the soft-start method for the inverter may comprise:

Step S1, sampling a grid voltage $V_g$ of the grid 300;

Step S2, calculating an output voltage $V_e$ of the controller 14, and calculating a virtual current $I_v$ based on the output voltage $V_e$ of the controller 14, the grid voltage $V_g$ and a virtual impedance $Z_v$;

Step S3, performing current closed-loop control by taking the virtual current $I_v$ as a feedback signal, and sending a relay control signal to turn on the relay 13 when a steady state is reached.

Further, the soft-start method for the inverter may comprise: sampling an inverter current $I_{inv}$, and comparing the inverter current $I_{inv}$ with a threshold value A; if the inverter current $I_{inv}$ is greater than or equal to the threshold value A, selecting the inverter current $I_{inv}$ as the feedback signal for current closed-loop control; and the inverter current $I_{inv}$ is less than the threshold value A, continuing to take the virtual current $I_{inv}$ as the feedback signal for current closed-loop control.

In some embodiments, the soft-start method for the inverter may further comprise: comparing the virtual current $I_v$ as the feedback signal to a current reference $I_{ref}$ to generate a current error and determining an output voltage $V_e$ of the controller 14 corresponding to the current error through a current regulator.

In some embodiments, the soft-start method for the inverter may further comprise: sampling a DC bulk voltage $V_{bus}$ for voltage loop control based on the DC bulk voltage $V_{bus}$ and a DC bulk reference value $V_{busref}$ and taking an output of the voltage loop as the current reference $I_{ref}$.

In some embodiments, the soft-start method for the inverter may further comprise: performing amplitude limit control the output of the voltage loop.

In some embodiments, the soft-start method for the inverter may further comprise: converting the grid voltage $V_g$ and the inverter current $I_{inv}$ into a voltage and a current in a dq synchronous rotating coordinate system through a coordinate transformation in a three-phase inverter. For example, the output of the voltage loop may be taken as a current reference $I_{dref}$ of the d-axis, and a current reference $I_{qref}$ of the q-axis may be set to be a preset value.

Figure 2:
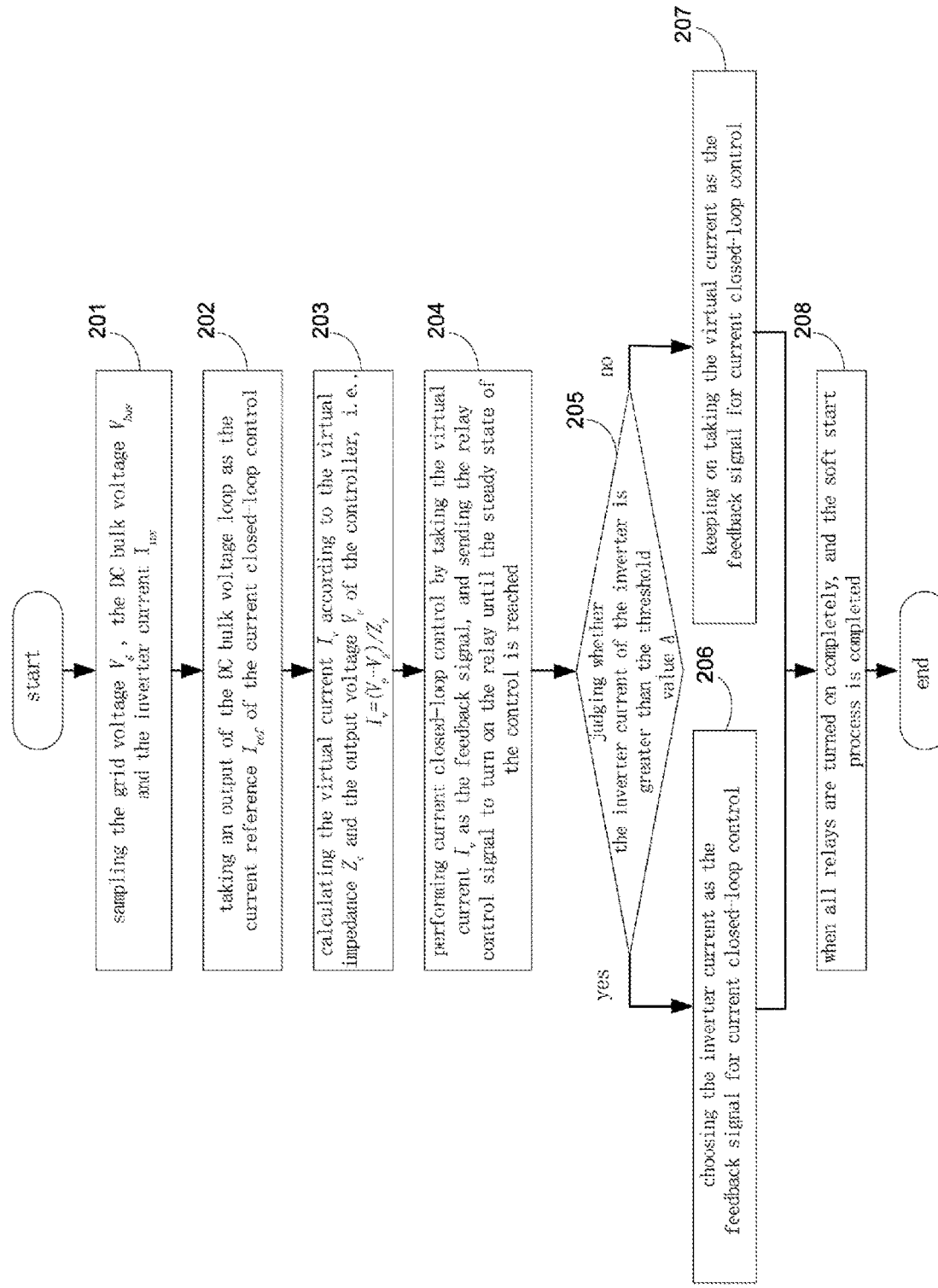
FIG. 2 is a flow diagram of a soft-start method for an inverter according to an embodiment of the invention.

As shown in FIG. 2, it illustrates the soft-start method for the inverter 100 in FIG. 1, which mainly comprises:

Step 201, sampling the grid voltage $V_g$, the DC bulk voltage $V_{bus}$, and the inverter current $I_{Inv}$.

Specifically, the grid voltage $V_g$ is an instantaneous grid voltage; the inverter current $I_{inv}$ can be considered as inductor current $I_L$.

Step 202, taking an output of the DC bulk voltage loop as the current reference $I_{ref}$ of the current closed-loop control.

Step 203, calculating the virtual current $I_v$ according to the virtual impedance $Z_v$ and the output voltage $V_e$ of the controller, i.e., $I_v=(V_e-V_g)/Z_v$. In some embodiment, in order to simplify the calculation, the virtual impedance $Z_v$ is selected, for example, to be 2Ω. Of course, it can be understood that the virtual impedance $Z_v$ is not limited thereto. For example, an impedance value also can be selected to be the same as the actual inductance.

Step 204, performing current closed-loop control by taking the virtual current $I_v$ as the feedback signal, and sending the relay control signal to turn on the relay until the steady state of the control is reached.

In step 204, when preparing to start the inverter, the virtual current $I_v$ is controlled to be the feedback signal. After entering into the steady state, $V_e=I_v*Z_v+V_g$, and a voltage drop $I_v*Z_v$ generated by the virtual current $I_v$ can be omitted relative to the grid voltage $V_g$, i.e., $V_e$ and $V_g$ are synchronized. After $V_e$ passes through the filter, a voltage $V_{inv}$ is generated on a capacitor $C_f$ before the relay. According to the characteristic of the filter, the voltage $V_{inv}$ is approximately equal to the grid voltage $V_g$. Therefore, the object of a small difference of voltages between the contactors of relay to be achieved. At this time, the relay control signal may be sent from the relay action control unit 147 to turn on the relay.

Step 205, judging whether the inverter current of the inverter is greater than the threshold value A, if "yes", performing step 205, and if "no", performing step 206.

If the inverter is a three-phase inverter, judging whether the inverter current of any phase is greater than the threshold value A is performed in step 206. Wherein, the inverter is the instantaneous inductor current.

Generally, there is a period presented between the relay turn-on signal to be sent to the relay being turned on actually. For the three-phase inverter, the three-phase relay may not be completely synchronized, so current often rapidly increases after the relay is turned on.

Step 206, if the inverter current is greater than or equal to the threshold value A, choosing the inverter current as the feedback signal for current closed-loop control.

Step 207, if the inverter current is less than the threshold value A, keeping on taking the virtual current as the feedback signal for current closed-loop control.

Step 208, when all relays are turned on completely, and the soft-start process is completed.

In step 202, the DC bulk voltage $V_{bus}$ also may be controlled by a regulator of the voltage control unit 145, and the control result is adopted as the current reference $I_{ref}$. In actual operation, the DC bulk reference value may be set slightly higher than the real bulk voltage. It shall be noted that when control of the virtual current is adopted, the DC bulk voltage cannot be affected practically. Therefore, the DC bulk voltage loop outputs a continuous increasing negative value (if a current flowing to the grid is defined to be positive) through a PI regulator, so the amplitude limit is required. When the inverter current (inductor current) is performed as a feedback signal, the DC bulk voltage loop works. In some embodiments, it can be understood that whether the DC bulk voltage loop works or not can be realized by the way of amplitude limiting, and can also be realized by switching from a fixed current reference to an output of the DC bulk voltage loop through a program.

In step 203, as for the three-phase inverter, the virtual current is calculated and controlled in the dq coordinate system. As for the single-phase inverter, the virtual current can be directly calculated and controlled.

In step 205, the threshold value A shall be greater than the maximum normal inverter current when the relay is turned off, i.e., the maximum current generated by the inverter on the filter to ensure that the inverter current is taken as the feedback signal before the relay is turned on completely. As for the three-phase inverter, the controller judges any phase of the instant inverter current is greater than the threshold value or not, and as for the single-phase inverter, the controller compares the instant inverter current being greater than the threshold value A or not directly.

FIG. 3 illustrates a control block diagram of the soft-start of the three-phase inverter according to the disclosure, wherein the grid voltage $V_g$ and the inverter current $I_{inv}$ (inductor current $I_L$) are sampled and are converted into dq rotating coordinate system from abc three-phase coordinate system through coordinate transformation. For example, the sampled grid voltage $V_g$ of the three-phase grid may be converted into a voltage $V_{g(dq)}$ in the dq rotating coordinate system through coordinate transformation, and the sampled inductor current $I_L$ (i.e., the inverter current) may be converted into a current $I_{L(dq)}$ in the dq rotating coordinate system through coordinate transformation.

The grid phase and the virtual current is obtained and calculated from grid voltage $V_g$. For example, the virtual current $I_{v(dq)}$ may be calculated through the virtual current calculating unit 142 in FIG. 3, wherein the virtual current $I_{v(d)}$ of the d-axis may be obtained by calculating a difference between the output voltage $V_{e(d)}$ of the d-axis and the grid voltage $V_{g(d)}$, and then dividing the virtual impedance $Z_v$, and the algorithm of the virtual current $I_{v(q)}$ of the q-axis is consistent with that of the d-axis.

In the soft-start process, the virtual current $I_{v(dq)}$ is adopted as a feedback control signal. When the relay turn-on signal is sent, the inductor current $I_L$ is compared to the threshold value A, and the inductor current $I_L$ is adopted as the feedback signal when conditions are satisfied. If an instant value of any phase of the inductor current $I_L$ is greater than A, the inductor current $I_L$ is controlled as the feedback signal, otherwise, the virtual current is controlled as the feedback signal. In other words, if $I_L$>A, $I_{(dq)}$=$I_{L(dq)}$, i.e., the inductor current $I_{L(dq)}$ is adopted as the feedback signal $I_{(dq)}$, and if $I_L$≤A, $I_{(dq)}$=$I_{v(dq)}$, i.e., the virtual current $I_{v(dq)}$ is adopted as the feedback signal $I_{(dq)}$.

In FIG. 3, the DC bulk voltage loop is controlled by the PI regulator, and which's output is set to the current reference of the d-axis. Specifically, the output of the PI regulator which is calculated based on the DC bulk voltage $V_{bus}$ and the DC bulk reference value $V_{busref}$ is adopted as the current reference $I_{dref}$ of the d-axis. In addition, the current reference of the q-axis may be set to zero, i.e., $I_{qref}$=0, and may also be values near zero, to regulate a phase angle between the output voltage $V_e$ and the grid voltage $V_g$ slightly. In this embodiment, the DC bulk voltage loop works when the inductor current is controlled and can stabilize the bulk voltage.

Further, the feedback signal $I_{(dq)}$ is compared to the current reference (for example, $I_{dref}$ and $I_{qref}$) to generate a current error, and PI regulation of the current loop is performed by a current regulator, such that an output voltage $V_{e(dq)}$ of the controller corresponding to the current error may be determined. Then the output voltage $V_{e(dq)}$ is converted into an output voltage $V_{e(abc)}$ in the three-phase coordinate system after a coordinate transformation, and a driving signal is generated to control the on/off of the switches of the main power circuit after amplitude variation (for example, 2/$V_{bus}$) and SVPWM modulation. It shall be understood that in this embodiment, the voltage loop and the current loop adopt PI control, while in other embodiments, other regulators, such as PR control, and the like, also may be adopted.

In this embodiment, the virtual impedance $Z_v$ may be resistive or inductive. The inductive virtual impedance, i.e., simulating the actual inductor, may have the effect of slowly increasing the current. In addition, the high-frequency section has an attenuated gain in the Bode diagram, which facilitates designing control parameters. Calculation of the resistive virtual impedance is relatively simple, and when the original controller is simple and stability may be ensured, the resistive virtual impedance may be selected.

FIG. 4 illustrates a control block diagram of soft-start when applied to the single-phase inverter according to the disclosure. Comparing with the three-phase inverter illustrated in FIG. 3, the single-phase inverter in FIG. 4 does not need coordinates transformation. Based on such difference, it requires some corresponding adjustments to the control block diagram. For example, the output of the DC bulk voltage loop is taken as the amplitude of current and has to be multiplied by sine, to become a current reference; and the current loop may adopt PI control or PR control, but the present invention is not limited thereto.

Figure 5:
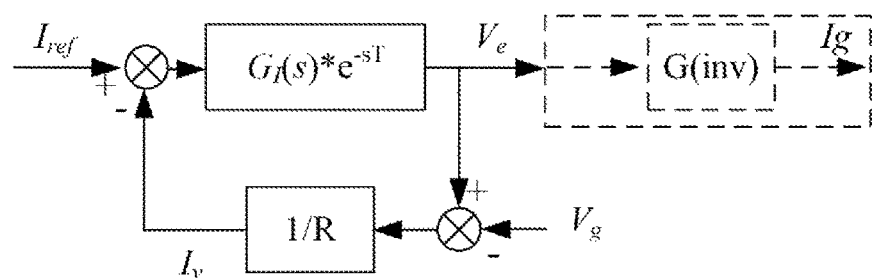
FIG. 5 is a control block diagram of the inverter with the virtual current method according to the invention.

FIG. 5 illustrates a control block diagram of control with the virtual current, wherein $G_I(s)$ is the transfer function of the current loop, T is a delay time. In this embodiment, the three-phase inverter adopts PI control. Then, as can be known from FIG. 5, a transfer function of an open-loop gain is:

$$G_{open}(s) = \frac{G_I(s)e^{-sT}}{Z_v}.$$

Figure 6:
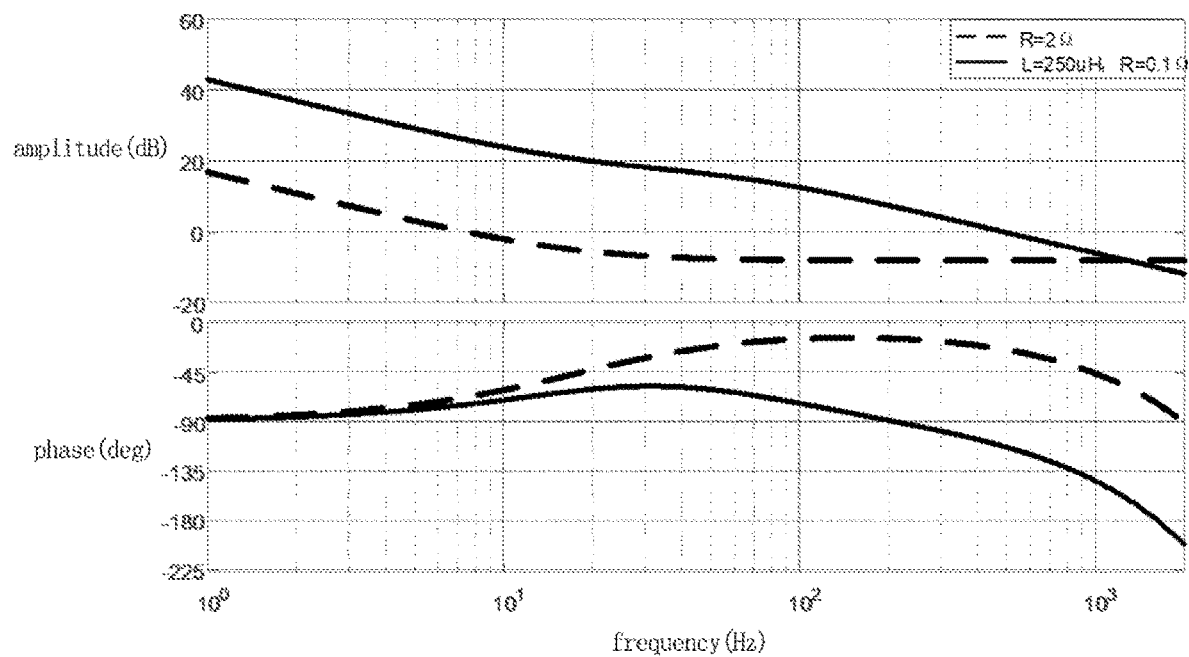
FIG. 6 is an open-loop Bode diagram when respectively selecting a virtual impedance $Z_v$ to be inductive and resistive based on an open-loop gain according to the invention.

FIG. 6 illustrates an open-loop Bode diagram when respectively setting the virtual impedance $Z_v$ to be inductive and resistive based on the open-loop gain $G_{open}(s)$ As can be known, as for the resistive virtual impedance, the larger the resistance is, the smaller the gain will be, and the slower a dynamic speed will be, but stability is ensured easier, so a compromise value may be selected according to requirement. As for the resistive virtual impedance, the same parameters as actual filter inductance often may be selected. In this embodiment, the resistive virtual impedance is selected, and the virtual impedance $Z_v$ is set to be 2Ω. It shall be understood that the virtual impedance may be calculated or set according to actual situations, but the present invention is not limited thereto.

The invention can safely start the inverter without increasing hardware circuits, such as a starting resistor, a voltage sampling circuit, or the like, through the soft-start method for the inverter based on control of the virtual current. Moreover, the invention may be suitable for the circumstance of inconsistent closing time of the three-phase relay, and can control energy to prevent failure of start caused by fluctuation of the bulk voltage effectively.

Although the invention has been disclosed by the above embodiments, the invention is not limited thereto. Without departing from the spirit and scope of the invention, those skilled in the art shall make various changes and modifications, so the protection scope of the invention shall be determined by the scope defined by the appended claims.

What is claimed is:

1. A soft-start method for an inverter electrically connected between a DC power supply and a grid, the inverter comprising a main power circuit, a filter, a relay, and a controller, and the main power circuit electrically coupled to the grid through the relay, and the controller electrically connected with the main power circuit and the relay, respectively, the soft-start method comprising:
  sampling a grid voltage of the grid;
  calculating an output voltage of the controller, and calculating a virtual current based on the output voltage of the controller, the grid voltage and a virtual impedance; and
  performing current closed-loop control by taking the virtual current as a feedback signal, and sending a relay control signal to turn on the relay upon a steady state being reached.

2. The soft-start method for the inverter according to claim 1, further comprising:
  sampling an inverter current, and comparing the inverter current with a threshold value;
  if the inverter current is greater than or equal to the threshold value, choosing the inverter current as the feedback signal for the current closed-loop control; and
  if the inverter current is less than the threshold value, keeping on taking the virtual current as the feedback signal for the current closed-loop control.

3. The soft-start method for the inverter according to claim 2, further comprising:
  comparing the virtual current with a current reference to generate a current error, and determining the output voltage of the controller corresponding to the current error through a current regulator.

4. The soft-start method for the inverter according to claim 3, further comprising:
  sampling a DC bulk voltage, performing voltage loop control based on the DC bulk voltage and a DC bulk reference value, and taking an output of the voltage loop as the current reference.

5. The soft-start method for the inverter according to claim 4, further comprising:
  performing amplitude limit control to the output of the voltage loop.

6. The soft-start method for the inverter according to claim 4, wherein the inverter is a single-phase inverter coupled to a single-phase grid through the relay, or the inverter is a three-phase inverter coupled to a three-phase grid through the relay.

7. The soft-start method for the inverter according to claim 6, when the inverter is a three-phase inverter coupled to a three-phase grid through the relay, further comprising:
  converting a three-phase grid voltage and a three-phase inverter current into a dq-axis voltage and a dq-axis current in a dq synchronous rotating coordinate system through coordinate transformation.

8. The soft start method for the inverter according to claim 7, further comprising:
  taking the output of the voltage loop as a d-axis current reference, and setting a q-axis current reference to be a preset value.

9. The soft-start method for the inverter according to claim 3, wherein the controller sends the relay control signal to turn on the relay after the current error is less than an error threshold value.

10. The soft-start method for the inverter according to claim 2, wherein the threshold value is set to be greater than a maximum normal inverter current when the relay is turned off.

11. The soft-start method for the inverter according to claim 1, wherein the virtual current is calculated by the following formula:

$$I_v = \frac{(V_e - V_g)}{Z_v},$$

wherein $I_v$ is the virtual current, $V_e$ is the output voltage of the controller, $V_g$ is the grid voltage, and $Z_v$ is the virtual impedance.

12. The soft-start method for the inverter according to claim 1, wherein the controller sends the relay control signal to turn on the relay after a delay time.

13. An inverter electrically connected between a DC power supply and a grid, and comprising a main power circuit, a filter, a relay, a controller, and the main power circuit electrically coupled to the grid through the relay, and the controller electrically connected with the main power circuit and the relay, respectively, the controller comprising:

a sampling unit for sampling a grid voltage of the grid;

a virtual current calculating unit for calculating an output voltage of the controller, and calculating a virtual current based on the output voltage of the controller, the grid voltage and a virtual impedance; and a current control unit for performing current closed-loop control by taking the virtual current as a feedback signal, and sending a relay control signal to turn on the relay upon a steady state being reached.

14. The inverter according to claim 13, wherein the sampling unit further samples an inverter current;

the controller further comprises a feedback selection unit configured to compare the inverter current with a threshold value;

if the inverter current is greater than or equal to the threshold, choosing the inverter current as the feedback signal for the current closed-loop control; and if the inverter current is less than the threshold value, keeping on taking the virtual current as the feedback signal for the current closed-loop control.

15. The inverter according to claim 14, wherein the current control unit further compares the virtual current with a current reference to generate a current error, and determines the output voltage of the controller corresponding to the current error through a current regulator.

16. The inverter according to claim 15, wherein the sampling unit further samples a DC bulk voltage, and the controller further comprises a voltage control unit for performing voltage loop control based on the DC bulk voltage and a DC bulk reference value and taking an output of the voltage loop as the current reference.

17. The inverter according to claim 16, wherein the voltage control unit further comprises an amplitude limit unit to perform amplitude limit control to the output of the voltage loop.

18. The inverter according to claim 16, wherein the inverter is a single-phase inverter coupled to a single-phase grid through the relay, or the inverter is a three-phase inverter coupled to a three-phase grid through the relay.

19. The inverter according to claim 18, when the inverter is a three-phase inverter coupled to a three-phase grid through the relay, the controller further comprises:

a coordinate conversion unit for converting a three-phase grid voltage and a three-phase inverter current into a dq-axis voltage and a dq-axis current in a dq synchronous rotating coordinate system through coordinate transformation.

20. The inverter according to claim 19, wherein in the three-phase inverter, the voltage control unit further takes the output of the voltage loop as a d-axis current reference and sets a q-axis current reference to be a preset value.

21. The inverter according to claim 15, wherein the controller sends the relay control signal to turn on the relay after the current error is less than an error threshold value.

22. The inverter according to claim 14, wherein the threshold value is set to be greater than a maximum normal inverter current when the relay is turned off.

23. The inverter according to claim 13, wherein the virtual current calculating unit calculates the virtual current based on the following formula:

$$I_v = \frac{(V_e - V_g)}{Z_v},$$

wherein $I_v$ is the virtual current, $V_e$ is the output voltage of the controller, $V_g$ is the grid voltage, and $Z_v$ is the virtual impedance.

24. The inverter according to claim 13, wherein the controller sends the relay control signal to turn on the relay after a delay time.

* * * * *